US011157361B2

United States Patent
Jaquette et al.

(10) Patent No.: US 11,157,361 B2
(45) Date of Patent: Oct. 26, 2021

(54) EFFICIENT UTILIZATION OF STORAGE SPACE IN ARRAYS OF STORAGE DRIVES

(71) Applicant: International Business Machines Corporation, Armonk, NY (US)

(72) Inventors: Glen Jaquette, Tucson, AZ (US); Jacob Smalts, Richmond, TX (US); David Mullen, Houston, TX (US); Van Smith, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 16/023,056

(22) Filed: Jun. 29, 2018

(65) Prior Publication Data

US 2020/0004631 A1 Jan. 2, 2020

(51) Int. Cl.
*G06F 3/06* (2006.01)
*G06F 11/10* (2006.01)

(52) U.S. Cl.
CPC .......... *G06F 11/1076* (2013.01); *G06F 3/064* (2013.01); *G06F 3/0619* (2013.01); *G06F 3/0683* (2013.01); *G06F 2211/1004* (2013.01); *G06F 2211/1014* (2013.01)

(58) Field of Classification Search
CPC .... G06F 11/1076; G06F 3/0619; G06F 3/064; G06F 3/0683; G06F 2211/1004; G06F 2211/1014
See application file for complete search history.

(56) References Cited

U.S. PATENT DOCUMENTS

| 5,615,352 A | 3/1997 | Jacobson et al. |
| 5,696,934 A | 12/1997 | Jacobson et al. |
| 5,754,756 A | 5/1998 | Watanabe et al. |
| 7,921,257 B1 | 4/2011 | Kleiman et al. |
| 9,594,633 B2 | 3/2017 | Colgrove et al. |
| 2002/0087785 A1 | 7/2002 | Milligan et al. |
| 2002/0191311 A1* | 12/2002 | Ulrich ............. G06F 16/10 360/1 |
| 2005/0097270 A1* | 5/2005 | Kleiman ......... G06F 11/1076 711/114 |

(Continued)

OTHER PUBLICATIONS

List of IBM Patents or Patent Applications Treated as Related.
(Continued)

*Primary Examiner* — Nanci N Wong
(74) *Attorney, Agent, or Firm* — Nelson IP; Daniel P. Nelson

(57) ABSTRACT

A method for more efficiently utilizing storage space in a set of storage drives is disclosed. In one embodiment, such a method implements, in a set of storage drives, a first RAID utilizing data striping with distributed parity values. The method further implements, in a subset of the set of storage drives, a second RAID using residual storage space in storage drives belonging to the subset. Storage drives belonging to the subset may have a storage capacity that is larger than storage drives not belonging to the subset. In certain embodiments, the method adaptively alters a parity rotation of the first RAID to provide an increased concentration of parity values in certain storage drives of the first RAID compared to other storage drives of the first RAID. A corresponding system and computer program product are also disclosed.

20 Claims, 13 Drawing Sheets

| | 18TB | 18TB | 18TB | 18TB | 18TB | 18TB | 18TB | 30TB | 30TB | 30TB | 18TB | 30TB |
|---|---|---|---|---|---|---|---|---|---|---|---|---|
| Comp. | Drive 1 | Drive 2 | Drive 3 | Drive 4 | Drive 5 | Drive 6 | Drive 7 | Drive 8 | Drive 9 | Drive 10 | Drive 11 | Drive 12 |
| 2.9 | Data | Data | Data | Data | Data | Data | Data | Parity | Data | Data | Data | Spare |
| 1.1 | Data | Data | Data | Data | Data | Data | Data | Data | Parity | Data | Data | Spare |
| 2.5 | Data | Data | Data | Data | Data | Data | Data | Data | Data | Parity | Data | Spare |
| 1.5 | Data | Data | Data | Data | Data | Data | Data | Data | Parity | Data | Data | Spare |
| 2 | Data | Data | Data | Data | Data | Data | Data | Data | Parity | Data | Data | Spare |
| 1.5 | Data | Data | Data | Data | Data | Data | Data | Data | Data | Parity | Data | Spare |
| 2.9 | Data | Data | Data | Data | Data | Data | Data | Parity | Data | Data | Data | Spare |
| ⋮ | | | | | | | | | | | | |
| 2.9 | Data | Data | Data | Data | Data | Data | Data | Data | Parity | Data | Data | Spare |
| 1.5 | Data | Data | Data | Data | Data | Data | Parity | Data | Data | Data | Data | Spare |
| 1.1 | Data | Data | Data | Data | Data | Data | Data | Data | Parity | Data | Data | Spare |
| 2.9 | Data | Data | Data | Data | Data | Data | Parity | Data | Data | Data | Data | Spare |
| 1.5 | Data | Data | Data | Data | Data | Data | Data | Data | Data | Parity | Data | Spare |
| 1.1 | Data | Data | Data | Data | Data | Data | Data | Data | Parity | Data | Data | Spare |
| 2 | Data | Data | Data | Data | Data | Data | Data | Data | Parity | Data | Data | Spare |
| 1.5 | Data | Data | Data | Data | Data | Data | Data | Data | Data | Parity | Data | Spare |
| 2 | Data | Data | Data | Data | Data | Data | Data | Data | Parity | Data | Data | Spare |
| 2.9 | Data | Data | Data | Data | Data | Data | Parity | Data | Data | Data | Data | Spare |
| 2.5 | Data | Data | Data | Data | Data | Data | Data | Parity | Data | Data | Data | Spare |
| 1.1 | Data | Data | Data | Data | Data | Data | Data | Data | Parity | Data | Data | Spare |
| 2 | | | | | | | | Data | Data | Parity | | Spare |
| 1.5 | | | | | | | | Data | Parity | Data | | Spare |
| 2.5 | | | | | | | | Parity | Data | Data | | Spare |
| 1.5 | | | | | | | | Data | Parity | Data | | Spare |
| 1 | | | | | | | | Data | Data | Parity | | Spare |
| 3 | | | | | | | | Data | Data | Parity | | Spare |
| 2.5 | | | | | | | | Parity | Data | Data | | Spare |
| 2 | | | | | | | | Data | Parity | Data | | Spare |

(56) References Cited

U.S. PATENT DOCUMENTS

| | | | |
|---|---|---|---|
| 2005/0102289 A1* | 5/2005 | Sonoda | G06F 16/10 |
| 2011/0196968 A1* | 8/2011 | Kobayashi | G06F 11/3409 709/226 |
| 2013/0086316 A1* | 4/2013 | Shah | G06F 12/0866 711/113 |
| 2013/0091237 A1* | 4/2013 | Arulambalam | H04L 65/60 709/213 |
| 2013/0145091 A1* | 6/2013 | Klemm | G06F 3/0644 711/114 |
| 2013/0151770 A1* | 6/2013 | Hara | G06F 3/0685 711/114 |
| 2017/0168738 A1* | 6/2017 | Thompson | G06F 3/0689 |
| 2017/0185331 A1* | 6/2017 | Gao | G06F 3/0619 |

OTHER PUBLICATIONS

Bashore et al., "Limited Distributed DASD Checksum, a RAID Hybrid," IP.com No. IPCOM000109640D, IP.com, Mar. 24, 2005.
"RAID Array Expansion," IP.com No. IPCOM000238883D, IP.com, Sep. 23, 2014.

* cited by examiner

Fig. 6A

| 18TB | 18TB | 18TB | 18TB | 18TB | 18TB | 18TB | 18TB | 18TB | 18TB | 18TB | 18TB | |
|---|---|---|---|---|---|---|---|---|---|---|---|---|
| Drive 1 | Drive 2 | Drive 3 | Drive 4 | Drive 5 | Drive 6 | Drive 7 | Drive 8 | Drive 9 | Drive 10 | Drive 11 | Drive 12 | Max. |
| 16.30 | 17.41 | 17.41 | 17.41 | 17.41 | 17.41 | 17.41 | 17.41 | 17.41 | 17.41 | 17.41 | Spare | 17.41 |
| 14.80 | 15.76 | 15.91 | 15.91 | 15.91 | 15.91 | 15.91 | 15.91 | 15.91 | 15.91 | 15.91 | Spare | 15.91 |
| 14.16 | 15.12 | 14.31 | 15.27 | 15.27 | 15.27 | 15.27 | 15.27 | 15.27 | 15.27 | 15.27 | Spare | 15.27 |
| 13.13 | 14.09 | 13.28 | 13.72 | 14.24 | 14.24 | 14.24 | 14.24 | 14.24 | 14.24 | 14.24 | Spare | 14.24 |
| 12.38 | 13.34 | 12.53 | 12.97 | 12.74 | 13.49 | 13.49 | 13.49 | 13.49 | 13.49 | 13.49 | Spare | 13.49 |
| 11.41 | 12.37 | 11.56 | 12.01 | 11.77 | 12.04 | 12.52 | 12.04 | 12.52 | 12.52 | 12.52 | Spare | 12.52 |
| 10.93 | 11.89 | 11.08 | 11.52 | 11.29 | 11.56 | 11.12 | 12.04 | 12.04 | 12.04 | 12.04 | Spare | 12.04 |
| 10.03 | 10.99 | 10.18 | 10.62 | 10.39 | 10.66 | 10.22 | 10.69 | 11.14 | 11.14 | 11.14 | Spare | 11.14 |
| 9.59 | 10.56 | 9.75 | 10.19 | 9.96 | 10.22 | 9.79 | 10.26 | 9.84 | 10.71 | 10.71 | Spare | 10.71 |
| 8.46 | 9.42 | 8.61 | 9.05 | 8.82 | 9.09 | 8.65 | 9.12 | 8.70 | 9.46 | 9.57 | Spare | 9.57 |
| 8.04 | 9.01 | 8.20 | 8.64 | 8.41 | 8.67 | 8.24 | 8.71 | 8.29 | 9.04 | 8.37 | Spare | 9.04 |
| 7.28 | 8.24 | 7.43 | 7.87 | 7.64 | 7.91 | 7.47 | 7.94 | 7.52 | 7.89 | 7.60 | Spare | 8.24 |
| 6.28 | 7.14 | 6.43 | 6.87 | 6.64 | 6.91 | 6.47 | 6.94 | 6.52 | 6.89 | 6.60 | Spare | 7.14 |
| 5.93 | 6.09 | 6.08 | 6.52 | 6.29 | 6.56 | 6.12 | 6.59 | 6.17 | 6.54 | 6.25 | Spare | 6.59 |
| 5.53 | 5.69 | 5.68 | 6.12 | 5.89 | 6.16 | 5.72 | 5.59 | 5.77 | 6.14 | 5.85 | Spare | 6.16 |
| 5.15 | 5.31 | 5.30 | 5.74 | 5.51 | 5.21 | 5.34 | 5.21 | 5.39 | 5.76 | 5.47 | Spare | 5.76 |
| 4.70 | 4.86 | 4.85 | 5.29 | 5.06 | 4.76 | 4.89 | 4.76 | 4.94 | 4.86 | 5.02 | Spare | 5.29 |
| 4.13 | 4.29 | 4.28 | 4.44 | 4.49 | 4.19 | 4.33 | 4.19 | 4.38 | 4.30 | 4.46 | Spare | 4.49 |
| ... | ... | ... | ... | ... | ... | ... | ... | ... | ... | ... | ... | |
| 1.58 | 1.42 | 1.74 | 1.66 | 1.68 | 1.64 | 1.58 | 1.65 | 1.41 | 1.70 | 1.41 | Spare | 1.74 |
| 1.28 | 1.12 | 1.29 | 1.36 | 1.38 | 1.34 | 1.28 | 1.35 | 1.11 | 1.40 | 1.11 | Spare | 1.40 |
| 0.92 | 0.76 | 0.92 | 1.00 | 1.02 | 0.98 | 0.92 | 0.98 | 0.74 | 1.00 | 0.75 | Spare | 1.02 |
| 0.75 | 0.58 | 0.75 | 0.83 | 0.67 | 0.81 | 0.74 | 0.81 | 0.57 | 0.83 | 0.57 | Spare | 0.83 |
| 0.55 | 0.38 | 0.55 | 0.63 | 0.47 | 0.61 | 0.54 | 0.61 | 0.37 | 0.53 | 0.37 | Spare | 0.63 |
| 0.42 | 0.26 | 0.42 | 0.38 | 0.34 | 0.48 | 0.42 | 0.48 | 0.24 | 0.40 | 0.25 | Spare | 0.48 |
| 0.35 | 0.19 | 0.36 | 0.31 | 0.27 | 0.41 | 0.35 | 0.28 | 0.17 | 0.33 | 0.18 | Spare | 0.41 |
| 0.29 | 0.13 | 0.30 | 0.25 | 0.21 | 0.26 | 0.29 | 0.22 | 0.11 | 0.27 | 0.12 | Spare | 0.30 |
| 0.20 | 0.04 | 0.20 | 0.16 | 0.12 | 0.17 | 0.20 | 0.13 | 0.02 | 0.18 | 0.03 | Spare | 0.20 |
| 0.20 | 0.04 | 0.20 | 0.16 | 0.12 | 0.17 | 0.20 | 0.13 | 0.02 | 0.18 | 0.03 | Spare | 0.20 |

Total = 1.44
0.7%

Fig. 6B

| Comp. | 18TB Drive 1 | 18TB Drive 2 | 18TB Drive 3 | 18TB Drive 4 | 18TB Drive 5 | 18TB Drive 6 | 18TB Drive 7 | 18TB Drive 8 | 18TB Drive 9 | 18TB Drive 10 | 18TB Drive 11 | 18TB Drive 12 |
|---|---|---|---|---|---|---|---|---|---|---|---|---|
| 2.9 | Parity | Data | Data | Data | Data | Data | Data | Data | Data | Data | Data | Spare |
| 1.1 | Data | Parity | Data | Data | Data | Data | Data | Data | Data | Data | Data | Spare |
| 2.5 | Data | Data | Parity | Data | Data | Data | Data | Data | Data | Data | Data | Spare |
| 1.5 | Data | Data | Data | Parity | Data | Data | Data | Data | Data | Data | Data | Spare |
| 2 | Data | Data | Data | Data | Parity | Data | Data | Data | Data | Data | Data | Spare |
| 1.5 | Data | Data | Data | Data | Data | Parity | Data | Data | Data | Data | Data | Spare |
| 2.9 | Data | Data | Data | Data | Data | Data | Parity | Data | Data | Data | Data | Spare |
| 1.5 | Data | Data | Data | Data | Data | Data | Data | Parity | Data | Data | Data | Spare |
| 3 | Data | Data | Data | Data | Data | Data | Data | Data | Parity | Data | Data | Spare |
| 1.1 | Data | Data | Data | Data | Data | Data | Data | Data | Data | Parity | Data | Spare |
| 2.9 | Data | Parity | Data | Data | Data | Data | Data | Data | Data | Data | Parity | Spare |
| ... | ... | ... | ... | ... | ... | ... | ... | ... | ... | ... | ... | ... |
| 2.5 | Data | Data | Data | Data | Data | Parity | Data | Data | Data | Data | Data | Spare |
| 2 | Data | Data | Data | Data | Data | Data | Parity | Data | Data | Parity | Data | Spare |
| 1.5 | Data | Data | Data | Data | Parity | Data | Data | Data | Data | Data | Parity | Spare |
| 1.5 | Data | Data | Data | Data | Data | Data | Data | Data | Parity | Data | Data | Spare |
| 3 | Data | Data | Data | Data | Data | Data | Data | Data | Data | Parity | Data | Spare |
| 1.5 | Data | Data | Data | Data | Data | Data | Data | Data | Data | Data | Data | Spare |
| 2.9 | Data | Data | Data | Data | Data | Data | Data | Data | Data | Parity | Data | Spare |
| 1.5 | Data | Parity | Data | Data | Data | Data | Data | Data | Data | Data | Data | Spare |

Fig. 7A

| 18TB | 18TB | 18TB | 18TB | 18TB | 18TB | 18TB | 18TB | 18TB | 18TB | 18TB | 18TB | |
|---|---|---|---|---|---|---|---|---|---|---|---|---|
| Drive 1 | Drive 2 | Drive 3 | Drive 4 | Drive 5 | Drive 6 | Drive 7 | Drive 8 | Drive 9 | Drive 10 | Drive 11 | Drive 12 | Max. |
| 16.30 | 17.41 | 17.41 | 17.41 | 17.41 | 17.41 | 17.41 | 17.41 | 17.41 | 17.41 | 17.41 | Spare | 17.41 |
| 14.80 | 15.76 | 15.91 | 15.91 | 15.91 | 15.91 | 15.91 | 15.91 | 15.91 | 15.91 | 15.91 | Spare | 15.91 |
| 14.16 | 15.12 | 14.31 | 15.27 | 15.27 | 15.27 | 15.27 | 15.27 | 15.27 | 15.27 | 15.27 | Spare | 15.27 |
| 13.13 | 14.09 | 13.28 | 13.72 | 14.24 | 14.24 | 14.24 | 14.24 | 14.24 | 14.24 | 14.24 | Spare | 14.24 |
| 12.38 | 13.34 | 12.53 | 12.97 | 12.74 | 13.49 | 13.49 | 13.49 | 13.49 | 13.49 | 13.49 | Spare | 13.49 |
| 11.41 | 12.37 | 11.56 | 12.01 | 11.77 | 12.04 | 12.52 | 12.52 | 12.52 | 12.52 | 12.52 | Spare | 12.52 |
| 10.93 | 11.89 | 11.08 | 11.52 | 11.29 | 11.56 | 11.12 | 12.04 | 12.04 | 12.04 | 12.04 | Spare | 12.04 |
| 10.03 | 10.99 | 10.18 | 10.62 | 10.39 | 10.66 | 10.22 | 10.69 | 11.14 | 11.14 | 11.14 | Spare | 11.14 |
| 9.59 | 10.56 | 9.75 | 10.19 | 9.96 | 10.22 | 9.79 | 10.26 | 9.84 | 10.71 | 10.71 | Spare | 10.71 |
| 8.46 | 9.42 | 8.61 | 9.05 | 8.82 | 9.09 | 8.65 | 9.12 | 8.70 | 9.46 | 9.57 | Spare | 9.57 |
| 8.04 | 9.01 | 8.20 | 8.64 | 8.41 | 8.67 | 8.24 | 8.71 | 8.29 | 9.04 | 8.37 | Spare | 9.04 |
| ... | ... | ... | ... | ... | ... | ... | ... | ... | ... | ... | ... | |
| 5.15 | 5.31 | 5.30 | 5.74 | 5.51 | 5.21 | 5.34 | 5.21 | 5.39 | 5.76 | 5.47 | Spare | 5.76 |
| 4.70 | 4.86 | 4.85 | 4.84 | 5.06 | 4.76 | 4.89 | 4.76 | 4.94 | 4.86 | 5.02 | Spare | 5.06 |
| 4.13 | 4.29 | 4.28 | 3.99 | 4.21 | 4.19 | 4.33 | 4.19 | 4.38 | 4.30 | 4.46 | Spare | 4.46 |
| 3.60 | 3.76 | 3.75 | 3.19 | 3.68 | 3.66 | 3.79 | 3.66 | 3.84 | 3.76 | 3.66 | Spare | 3.84 |
| 3.35 | 3.51 | 3.50 | 2.44 | 3.43 | 3.41 | 3.54 | 3.41 | 3.09 | 3.51 | 3.41 | Spare | 3.54 |
| 2.88 | 3.04 | 3.03 | 1.74 | 2.96 | 2.94 | 2.84 | 2.94 | 2.63 | 3.05 | 2.94 | Spare | 3.05 |
| 2.66 | 2.82 | 2.81 | 1.09 | 2.74 | 2.72 | 2.62 | 2.72 | 2.40 | 2.40 | 2.72 | Spare | 2.82 |
| 2.26 | 2.22 | 2.41 | 0.49 | 2.34 | 2.32 | 2.22 | 2.32 | 2.00 | 2.00 | 2.32 | Spare | 2.41 |
| 2.26 | 2.22 | 2.41 | 0.49 | 2.34 | 2.32 | 2.22 | 2.32 | 2.00 | 2.00 | 2.32 | Total = | 22.89 |
| | | | | | | | | | | | | 11.6% |

Fig. 7B

| Comp. | 18TB<br>Drive 1 | 18TB<br>Drive 2 | 18TB<br>Drive 3 | 18TB<br>Drive 4 | 18TB<br>Drive 5 | 18TB<br>Drive 6 | 18TB<br>Drive 7 | 30TB<br>Drive 8 | 18TB<br>Drive 9 | 18TB<br>Drive 10 | 18TB<br>Drive 11 | 30TB<br>Drive 12 |
|---|---|---|---|---|---|---|---|---|---|---|---|---|
| 2.9 | Data | Data | Data | Data | Data | Data | Data | Parity | Data | Data | Data | Spare |
| 1.1 | Data | Data | Data | Data | Data | Data | Data | Parity | Data | Data | Data | Spare |
| 2.5 | Data | Data | Data | Data | Data | Data | Data | Parity | Data | Data | Data | Spare |
| 1.5 | Data | Data | Data | Data | Data | Data | Data | Parity | Data | Data | Data | Spare |
| 2 | Data | Data | Data | Data | Data | Data | Data | Parity | Data | Data | Data | Spare |
| 1.5 | Data | Data | Data | Data | Data | Data | Data | Parity | Data | Data | Data | Spare |
| 2.9 | Data | Data | Data | Data | Data | Data | Data | Parity | Data | Data | Data | Spare |
| 1.5 | Data | Data | Data | Data | Data | Data | Data | Parity | Data | Data | Data | Spare |
| 3 | Data | Data | Data | Data | Data | Data | Data | Parity | Data | Data | Data | Spare |
| 1.1 | Data | Data | Data | Data | Data | Data | Data | Parity | Data | Data | Data | Spare |
| 2.9 | Data | Data | Data | Data | Data | Data | Data | Parity | Data | Data | Data | Spare |
| 1.5 | Data | Data | Data | Data | Data | Data | Data | Parity | Data | Data | Data | Spare |
| 1.1 | Data | Data | Data | Data | Data | Data | Data | Parity | Data | Data | Data | Spare |
| 3 | Data | Data | Data | Data | Data | Data | Data | Data | Data | Data | Data | Spare |
| 2.5 | Data | Data | Data | Data | Data | Data | Data | Data | Data | Data | Data | Spare |
| 2.5 | Data | Data | Data | Data | Data | Data | Data | Data | Data | Data | Data | Spare |
| 2 | Data | Data | Data | Data | Data | Data | Data | Data | Data | Data | Data | Spare |
| 1.5 | Data | Data | Data | Data | Data | Data | Data | Data | Data | Data | Data | Spare |
| 1.5 | Data | Data | Data | Data | Data | Data | Data | Data | Data | Data | Data | Spare |
| 3 | Data | Data | Data | Data | Data | Data | Data | Data | Data | Data | Data | Spare |
| 1.5 | Data | Parity | Data | Data | Data | Data | Data | Data | Data | Data | Data | Spare |
| 2.9 | Parity | Data | Data | Data | Data | Data | Data | Data | Data | Data | Data | Spare |
| 1.5 | Data | Data | Parity | Data | Data | Data | Data | Data | Data | Data | Data | Spare |
| 1.1 | Data | Data | Data | Data | Parity | Data | Data | Data | Data | Data | Data | Spare |
| 2.9 | Data | Data | Data | Data | Data | Data | Data | Data | Data | Data | Data | Spare |
| ... | ... | ... | ... | ... | ... | ... | ... | ... | ... | ... | ... | ... |
| 2.5 | Data | Data | Data | Data | Data | Data | Data | Data | Data | Parity | Data | Spare |
| 1.1 | Data | Data | Data | Data | Data | Data | Data | Data | Data | Data | Parity | Spare |
| 1.1 | Data | Data | Data | Data | Data | Data | Data | Data | Data | Data | Data | Spare |

Fig. 8A

| 18TB | 18TB | 18TB | 18TB | 18TB | 18TB | 18TB | 30TB | 18TB | 18TB | 18TB | 30TB | |
|---|---|---|---|---|---|---|---|---|---|---|---|---|
| Drive 1 | Drive 2 | Drive 3 | Drive 4 | Drive 5 | Drive 6 | Drive 7 | Drive 8 | Drive 9 | Drive 10 | Drive 11 | Drive 12 | Max. |
| 17.40 | 17.40 | 17.40 | 17.40 | 17.40 | 17.40 | 17.40 | 28.25 | 17.40 | 17.40 | 17.40 | Spare | 28.25 |
| 15.85 | 15.85 | 15.85 | 15.85 | 15.85 | 15.85 | 15.85 | 26.55 | 15.85 | 15.85 | 15.85 | Spare | 26.55 |
| 15.19 | 15.19 | 15.19 | 15.19 | 15.19 | 15.19 | 15.19 | 24.90 | 15.19 | 15.19 | 15.19 | Spare | 24.90 |
| 14.12 | 14.12 | 14.12 | 14.12 | 14.12 | 14.12 | 14.12 | 23.30 | 14.12 | 14.12 | 14.12 | Spare | 23.30 |
| 13.35 | 13.35 | 13.35 | 13.35 | 13.35 | 13.35 | 13.35 | 21.75 | 13.35 | 13.35 | 13.35 | Spare | 21.75 |
| 12.35 | 12.35 | 12.35 | 12.35 | 12.35 | 12.35 | 12.35 | 20.25 | 12.35 | 12.35 | 12.35 | Spare | 20.25 |
| 11.85 | 11.85 | 11.85 | 11.85 | 11.85 | 11.85 | 11.85 | 18.80 | 11.85 | 11.85 | 11.85 | Spare | 18.80 |
| 10.91 | 10.91 | 10.91 | 10.91 | 10.91 | 10.91 | 10.91 | 17.40 | 10.91 | 10.91 | 10.91 | Spare | 17.40 |
| 10.46 | 10.46 | 10.46 | 10.46 | 10.46 | 10.46 | 10.46 | 16.05 | 10.46 | 10.46 | 10.46 | Spare | 16.05 |
| 9.28 | 9.28 | 9.28 | 9.28 | 9.28 | 9.28 | 9.28 | 14.75 | 9.28 | 9.28 | 9.28 | Spare | 14.75 |
| 8.85 | 8.85 | 8.85 | 8.85 | 8.85 | 8.85 | 8.85 | 13.49 | 8.85 | 8.85 | 8.85 | Spare | 13.49 |
| 8.05 | 8.05 | 8.05 | 8.05 | 8.05 | 8.05 | 8.05 | 12.29 | 8.05 | 8.05 | 8.05 | Spare | 12.29 |
| 7.00 | 7.00 | 7.00 | 7.00 | 7.00 | 7.00 | 7.00 | 11.14 | 7.00 | 7.00 | 7.00 | Spare | 11.14 |
| 6.64 | 6.64 | 6.64 | 6.64 | 6.64 | 6.64 | 6.64 | 10.04 | 6.64 | 6.64 | 6.64 | Spare | 10.04 |
| 6.22 | 6.22 | 6.22 | 6.22 | 6.22 | 6.22 | 6.22 | 8.99 | 6.22 | 6.22 | 6.22 | Spare | 8.99 |
| 5.82 | 5.82 | 5.82 | 5.82 | 5.82 | 5.82 | 5.82 | 7.99 | 5.82 | 5.82 | 5.82 | Spare | 7.99 |
| 5.34 | 5.34 | 5.34 | 5.34 | 5.34 | 5.34 | 5.34 | 7.04 | 5.34 | 5.34 | 5.34 | Spare | 7.04 |
| 4.74 | 4.74 | 4.74 | 4.74 | 4.74 | 4.74 | 4.74 | 6.14 | 4.74 | 4.74 | 4.74 | Spare | 6.14 |
| 4.17 | 4.17 | 4.17 | 4.17 | 4.17 | 4.17 | 4.17 | 5.29 | 4.17 | 4.17 | 4.17 | Spare | 5.29 |
| 3.91 | 3.91 | 3.91 | 3.91 | 3.91 | 3.91 | 3.91 | 4.49 | 3.91 | 3.91 | 3.91 | Spare | 4.49 |
| 3.41 | 3.41 | 3.41 | 3.41 | 3.41 | 3.41 | 3.41 | 3.74 | 3.41 | 3.41 | 3.41 | Spare | 3.74 |
| 3.17 | 3.17 | 3.17 | 3.17 | 3.17 | 3.17 | 3.17 | 3.04 | 3.17 | 3.17 | 3.17 | Spare | 3.17 |
| 2.51 | 2.73 | 2.73 | 2.73 | 2.73 | 2.73 | 2.73 | 2.61 | 2.73 | 2.73 | 2.73 | Spare | 2.73 |
| 1.97 | 2.13 | 2.19 | 2.19 | 2.19 | 2.19 | 2.19 | 2.06 | 2.19 | 2.19 | 2.19 | Spare | 2.19 |
| 1.78 | 1.94 | 1.64 | 2.00 | 2.00 | 2.00 | 2.00 | 1.87 | 2.00 | 2.00 | 2.00 | Spare | 2.00 |
| 0.37 | 0.53 | 0.22 | 0.42 | 0.54 | 0.38 | 0.47 | 0.46 | 0.43 | 0.42 | 0.58 | Spare | 0.58 |
| 0.29 | 0.45 | 0.14 | 0.34 | 0.46 | 0.30 | 0.39 | 0.38 | 0.35 | 0.34 | 0.38 | Spare | 0.46 |
| 0.15 | 0.31 | 0.00 | 0.20 | 0.31 | 0.16 | 0.25 | 0.24 | 0.21 | 0.20 | 0.24 | Spare | 0.31 |
| 0.15 | 0.31 | 0.00 | 0.20 | 0.31 | 0.16 | 0.25 | 0.24 | 0.21 | 0.20 | 0.24 | | Total = 2.27 |
| | | | | | | | | | | | | 1.1% |

| 18TB | 18TB | 18TB | 18TB | 18TB | 18TB | 18TB | 30TB | 30TB | 30TB | 30TB | 18TB | 30TB | |
|---|---|---|---|---|---|---|---|---|---|---|---|---|---|
| Drive 1 | Drive 2 | Drive 3 | Drive 4 | Drive 5 | Drive 6 | Drive 7 | Drive 8 | Drive 9 | Drive 10 | Drive 11 | Drive 12 | | Max. |
| 17.39 | 17.39 | 17.39 | 17.39 | 17.39 | 17.39 | 17.39 | 28.23 | 29.39 | 29.39 | 17.39 | Spare | | 29.39 |
| 15.83 | 15.83 | 15.83 | 15.83 | 15.83 | 15.83 | 15.83 | 26.67 | 27.67 | 27.83 | 15.83 | Spare | | 27.83 |
| 15.16 | 15.16 | 15.16 | 15.16 | 15.16 | 15.16 | 15.16 | 26.00 | 27.00 | 26.16 | 15.16 | Spare | | 27.00 |
| 14.08 | 14.08 | 14.08 | 14.08 | 14.08 | 14.08 | 14.08 | 24.92 | 25.38 | 25.08 | 14.08 | Spare | | 25.38 |
| 13.29 | 13.29 | 13.29 | 13.29 | 13.29 | 13.29 | 13.29 | 24.13 | 23.81 | 24.29 | 13.29 | Spare | | 24.29 |
| 12.28 | 12.28 | 12.28 | 12.28 | 12.28 | 12.28 | 12.28 | 23.12 | 22.80 | 22.77 | 12.28 | Spare | | 23.12 |
| 11.77 | 11.77 | 11.77 | 11.77 | 11.77 | 11.77 | 11.77 | 21.65 | 22.29 | 22.26 | 11.77 | Spare | ... | 22.29 |
| 2.93 | 2.93 | 2.93 | 2.93 | 2.93 | 2.93 | 2.93 | 11.02 | 10.65 | 10.80 | 2.93 | Spare | | 11.02 |
| 2.49 | 2.49 | 2.49 | 2.49 | 2.49 | 2.49 | 2.49 | 10.35 | 10.20 | 10.36 | 2.49 | Spare | | 10.36 |
| 1.92 | 1.92 | 1.92 | 1.92 | 1.92 | 1.92 | 1.92 | 9.79 | 9.64 | 9.74 | 1.92 | Spare | | 9.79 |
| 1.73 | 1.73 | 1.73 | 1.73 | 1.73 | 1.73 | 1.73 | 9.22 | 9.44 | 9.54 | 1.73 | Spare | | 9.54 |
| 1.38 | 1.38 | 1.38 | 1.38 | 1.38 | 1.38 | 1.38 | 8.87 | 9.10 | 9.02 | 1.38 | Spare | | 9.10 |
| 0.95 | 0.95 | 0.95 | 0.95 | 0.95 | 0.95 | 0.95 | 8.44 | 8.63 | 8.59 | 0.95 | Spare | | 8.63 |
| 0.74 | 0.74 | 0.74 | 0.74 | 0.74 | 0.74 | 0.74 | 8.23 | 8.21 | 8.38 | 0.74 | Spare | | 8.38 |
| 0.49 | 0.49 | 0.49 | 0.49 | 0.49 | 0.49 | 0.49 | 7.98 | 7.96 | 8.01 | 0.49 | Spare | | 8.01 |
| 0.33 | 0.33 | 0.33 | 0.33 | 0.33 | 0.33 | 0.33 | 7.82 | 7.80 | 7.69 | 0.33 | Spare | | 7.82 |
| 0.24 | 0.24 | 0.24 | 0.24 | 0.24 | 0.24 | 0.24 | 7.55 | 7.71 | 7.60 | 0.24 | Spare | | 7.71 |
| 0.15 | 0.15 | 0.15 | 0.15 | 0.15 | 0.15 | 0.15 | 7.47 | 7.49 | 7.51 | 0.15 | Spare | | 7.51 |
| 0.00 | 0.00 | 0.00 | 0.00 | 0.00 | 0.00 | 0.00 | 7.31 | 7.33 | 7.34 | 0.00 | Spare | | 7.34 |
| | | | | | | | 6.67 | 6.69 | 6.05 | | Spare | | 6.69 |
| | | | | | | | 5.81 | 5.40 | 5.19 | | Spare | | 5.81 |
| | | | | | | | 4.52 | 4.88 | 4.68 | | Spare | | 4.88 |
| | | | | | | | 3.66 | 3.59 | 3.82 | | Spare | | 3.82 |
| | | | | | | | 2.37 | 2.30 | 2.53 | | Spare | | 2.53 |
| | | | | | | | 1.94 | 1.87 | 1.24 | | Spare | | 1.94 |
| | | | | | | | 0.65 | 1.36 | 0.72 | | Spare | | 1.36 |
| | | | | | | | 0.00 | 0.07 | 0.07 | | Spare | | 0.07 |
| 0.00 | 0.00 | 0.00 | 0.00 | 0.00 | 0.00 | 0.00 | 0.00 | 0.07 | 0.07 | 0.00 | | Total = | 0.13 |
| | | | | | | | | | | | | | 0.1% |

Fig. 9B

EFFICIENT UTILIZATION OF STORAGE SPACE IN ARRAYS OF STORAGE DRIVES

BACKGROUND

Field of the Invention

This invention relates to systems and methods for more efficiently utilizing storage space in redundant arrays of independent disks.

Background of the Invention

A RAID (i.e., a Redundant Array of Independent Disks) is a storage technology that provides increased storage functions and reliability through redundancy. A RAID is created by combining multiple storage drive components (e.g., disk drives and/or solid state drives) into a logical unit. Data is then distributed across the drives using various techniques, referred to as "RAID levels." The standard RAID levels, which currently include RAID levels 1 through 6, are a basic set of RAID configurations that employ striping, mirroring, and/or parity to provide data redundancy. Each of the configurations provides a balance between two key goals: (1) increasing data reliability and (2) increasing I/O performance.

The most commonly used RAID levels (currently RAID-5 and RAID-6) utilize block-level striping with distributed parity values. The parity values are typically rotated around the drives in a round-robin fashion so that each drive in the RAID substantially equally participates in storing parity values. Thus, for a RAID-5 array of N drives, each drive in the array may store one parity value for each N strides written to the array. When all of the storage drives in the RAID have the same storage capacity and the data stored thereon is written in an uncompressed format, this fixed rotation technique typically works well. However, when storage drives have different effective storage capacities and/or data is compressed prior to being stored on the drives, this fixed rotation technique will typically not yield the optimal array capacity. In particular, when either of these conditions exist, some storage drives in the RAID may fill to capacity prior to other storage drives, thereby leaving some storage space in certain storage drives empty and not utilized.

In view of the foregoing, what are needed are systems and methods to more optimally utilize storage space in RAID arrays utilizing block-level striping with distributed parity values. Ideally, such systems and methods will be effective to optimize storage space utilization in RAID arrays using storage drives of differing storage capacities and/or storing compressed data.

SUMMARY

The invention has been developed in response to the present state of the art and, in particular, in response to the problems and needs in the art that have not yet been fully solved by currently available systems and methods. Accordingly, the invention has been developed to more efficiently utilize storage space in redundant arrays of independent disks. The features and advantages of the invention will become more fully apparent from the following description and appended claims, or may be learned by practice of the invention as set forth hereinafter.

Consistent with the foregoing, a method for more efficiently utilizing storage space in a set of storage drives is disclosed. In one embodiment, such a method implements, in a set of storage drives, a first RAID utilizing data striping with distributed parity values. The method further implements, in a subset of the set of storage drives, a second RAID using residual storage space in storage drives belonging to the subset. Storage drives belonging to the subset may have a storage capacity that is larger than storage drives not belonging to the subset. In certain embodiments, the method adaptively alters a parity rotation of the first RAID to provide an increased concentration of parity values in certain storage drives of the first RAID compared to other storage drives of the first RAID.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 6A is a table showing, for a RAID storing compressed data and made up of storage drives of equal storage capacity, adjusting parity rotation based on variations in data compressibility and remaining storage space in each storage drive;

FIG. 6B is a table showing remaining storage capacity in each storage drive for the scenario shown in FIG. 6A;

FIG. 7A is a table showing, for a RAID storing compressed data and made up of storage drives of equal storage capacity, adjusting parity rotation based on variations in data compressibility and, in this example, failure of a data compression engine;

FIG. 7B is a table showing remaining storage capacity in each storage drive for the scenario shown in FIG. 7A;

FIG. 8A is a table showing, for a RAID storing compressed data and made up of storage drives of differing storage capacities, adjusting parity rotation based on variations in data compressibility and remaining storage space in each storage drive;

FIG. 8B is a table showing remaining storage capacity in each storage drive for the scenario shown in FIG. 8A;

FIG. 9A is a table showing, for a RAID storing compressed data and made up of storage drives of differing storage capacities, creating a second shorter stride RAID using residual storage space from larger capacity storage drives; and FIG. 9B is a table showing remaining storage capacity in each storage drive for the scenario shown in FIG. 9A.

DETAILED DESCRIPTION

Figure 1:
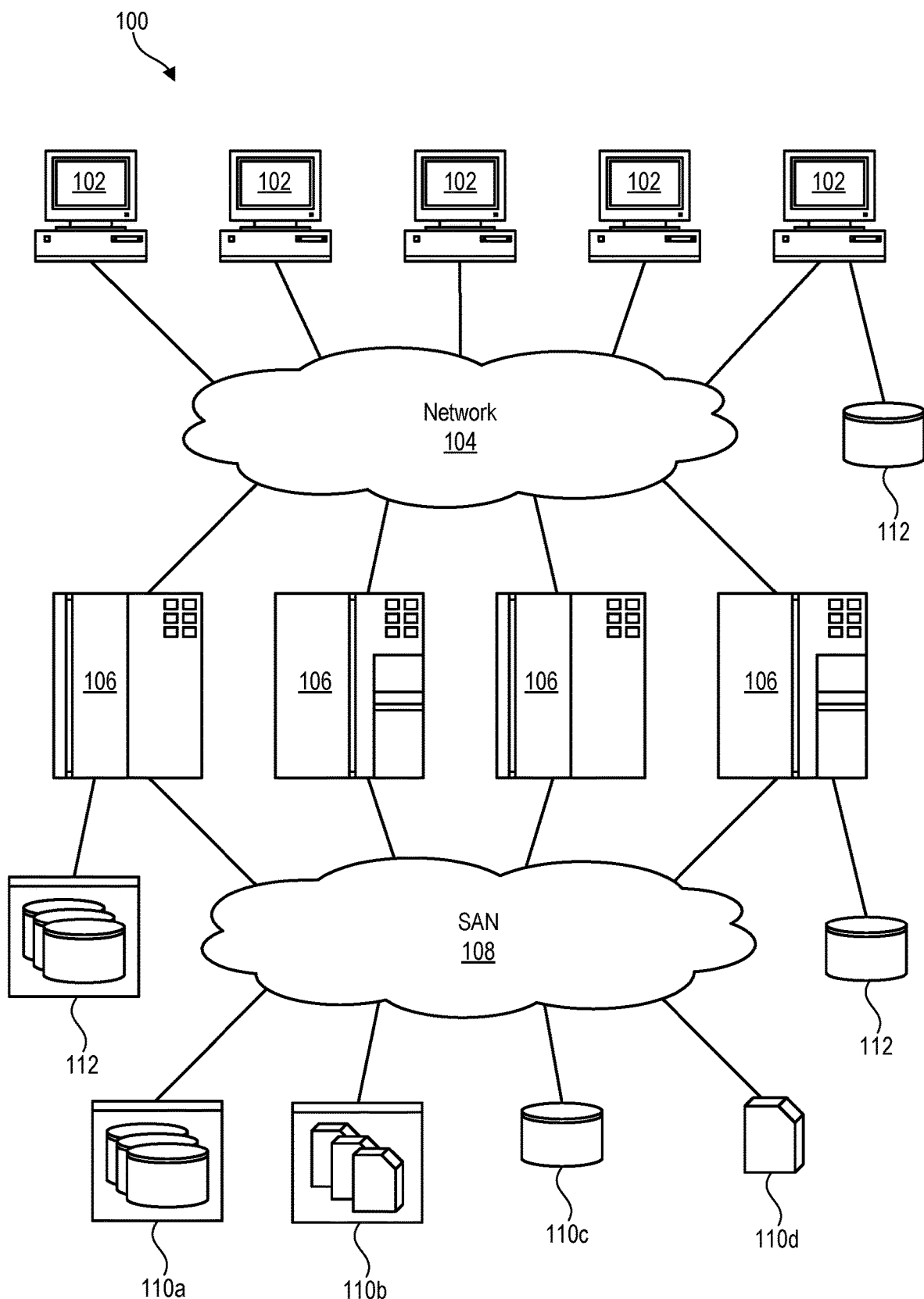
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
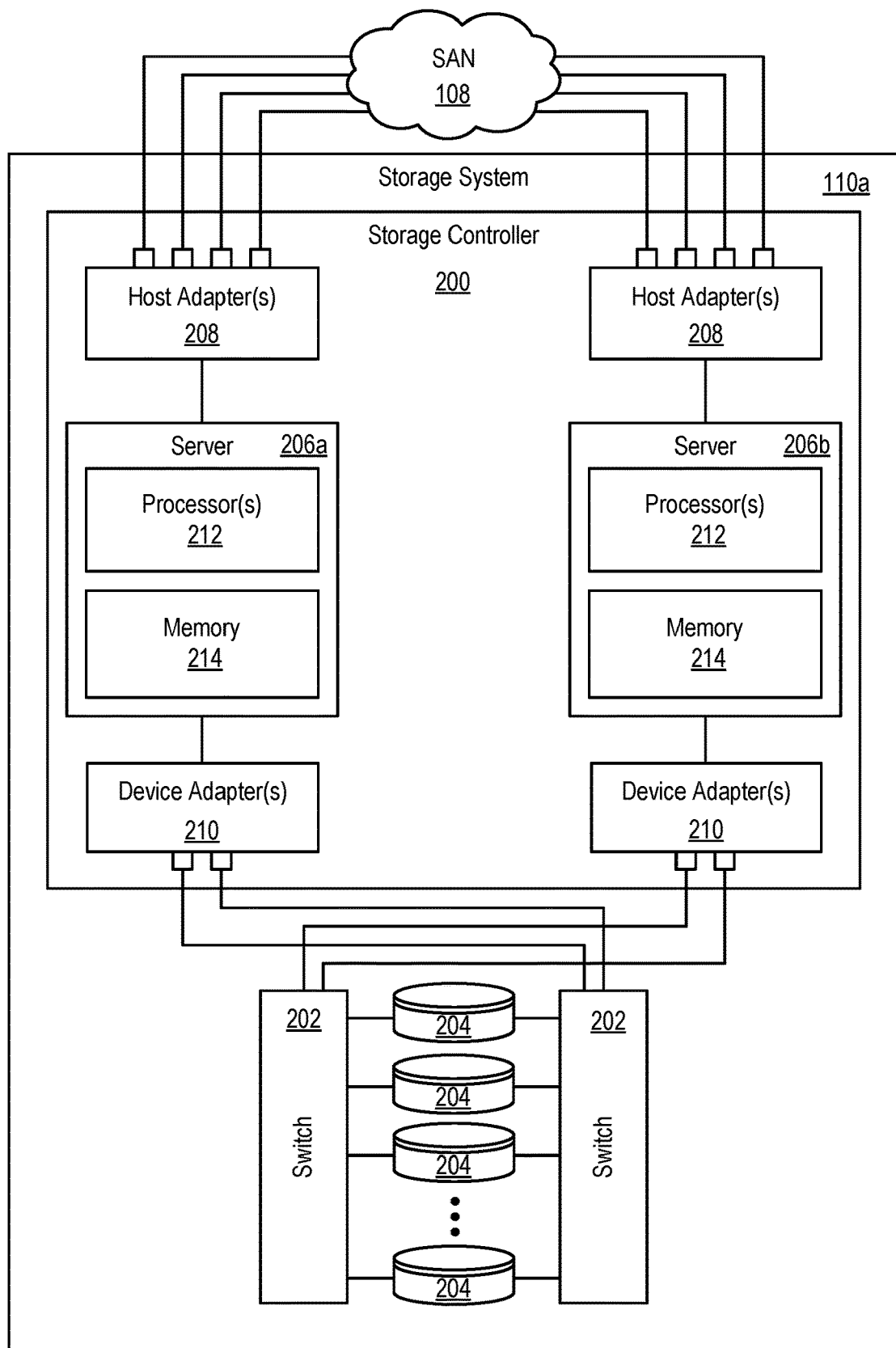
FIG. 2 is a high-level block diagram showing one embodiment of a storage system in which a RAID may be implemented.

Referring to FIG. 2, one example of a storage system 110a containing an array of hard-disk drives 204 and/or solid-state drives 204 is illustrated. The internal components of the storage system 110a are shown since a RAID may, in certain embodiments, be implemented all or partly within such a storage system 110a. As shown, the storage system 110a includes a storage controller 200, one or more switches 202, and one or more storage drives 204, such as hard-disk drives 204 and/or solid-state drives 204 (e.g., flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110a, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

In certain embodiments, the storage drives 204 of the storage system 110 may be configured in a RAID to provide a desired level of reliability and/or I/O performance. As previously mentioned, the most commonly utilized RAID levels are currently RAID-5 and RAID-6. These RAID levels utilize block-level striping with distributed parity values. The parity values are typically rotated around the drives in a round-robin fashion so that each drive in the RAID substantially equally participates in storing parity values. Thus, for a RAID-5 array of N drives, each drive in the array may store one parity value for each N strides written to the array. When all of the storage drives in the RAID have the same storage capacity and the data stored thereon is written in an uncompressed format, this fixed rotation technique typically works well. However, when storage drives have different effective capacities and/or data is compressed prior to being stored on the drives, this fixed rotation technique will typically not yield an optimal array capacity. Specifically, when either of these conditions exist, some storage drives in the RAID may fill to capacity prior to other storage drives, thereby leaving some storage space in certain storage drives empty and not utilized.

Figure 3A:
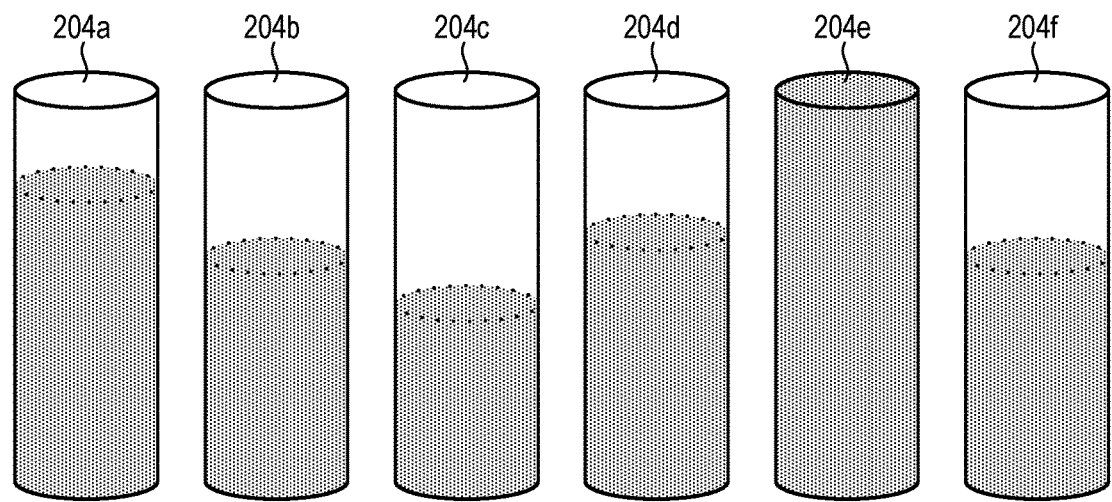
FIG. 3A shows non-optimal utilization of storage space in a RAID having storage drives of substantially equal storage capacity.

For example, FIG. 3A shows a RAID made up of six storage drives 204a-f of substantially equal storage capacity. Assume that the RAID array utilizes block-level striping with distributed parity values. Further assume that data is compressed prior to being stored on the storage drives 204a-f.

Because a parity value is created by XORing data on the other storage drives 204, a parity value will typically be less compressible than the data that is XORed to create the parity value. The compressibility of the parity value is typically inversely proportional or related to the number of data values that are XORed together. The number of data values depends on the number of storage drives 204 that data is striped across in the RAID array.

Because a parity value is typically less compressible than the data that is used to generate the parity value, the parity value will typically be larger in size than the data after compression. Thus, the parity value will typically occupy more storage space on a storage drive 204 than each corresponding data value from which it was created. As can be appreciated by those of skill in the art, this may result in sub-optimal utilization of storage space in the RAID since certain storage drives 204 may have their storage capacity consumed prior to others. Using a fixed parity rotation may result in a situation similar to that shown in FIG. 3A, where one storage drive 204e has filled to capacity prior to the other storage drives 204a-d, 204f (the shaded areas are intended to represent the amount of storage capacity consumed in each storage drive 204). This may result in unused storage capacity in the other storage drives 204 and sub-optimal utilization of storage space in the RAID.

Figure 3B:
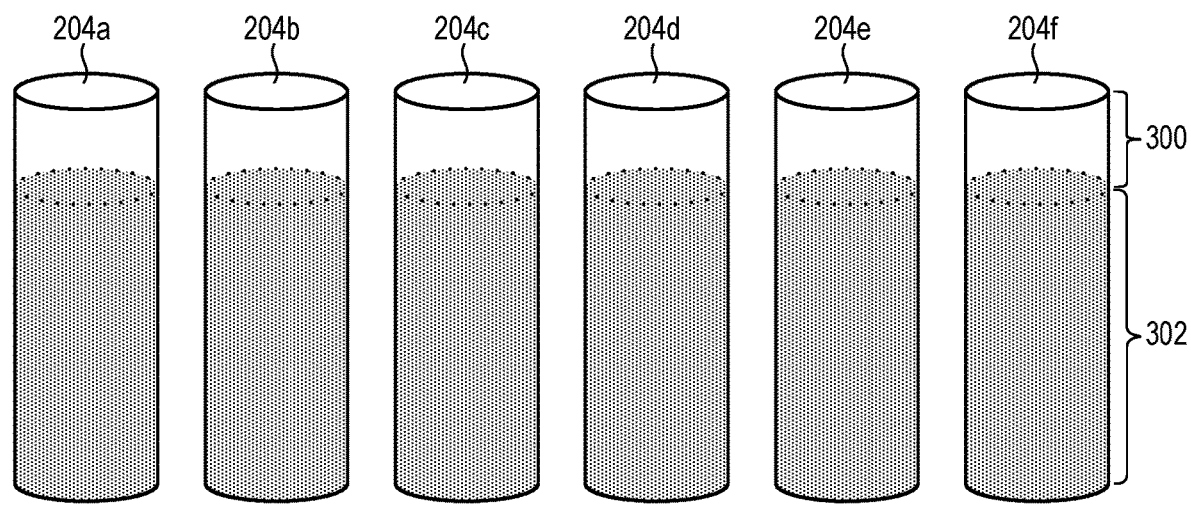
FIG. 3B shows use of adaptive parity rotation to create a more optimal utilization of storage space in a RAID having storage drives of substantially equal storage capacity.

Referring to FIG. 3B, as will be shown in more detail hereafter, systems and methods in accordance with the invention may adaptively alter the parity rotation of a RAID to provide an increased concentration of parity values in certain storage drives 204 of the RAID compared to other storage drives 204 of the RAID. This will ideally cause storage capacity in the storage drives 204 to be consumed at substantially the same rate, maintain substantially the same amount of residual storage capacity 300 in each of the storage drives 204, and/or maintain substantially the same amount of consumed storage capacity 302 in each of the storage drives 204. In certain embodiments, systems and methods in accordance with the invention may utilize a fixed parity rotation for some portion of the RAID, while using an adaptive parity rotation for another portion of the RAID to achieve more optimal storage utilization within the RAID.

Using the systems and methods disclosed herein, even when data is compressed prior to being stored in the RAID, a situation more akin to that illustrated in FIG. 3B may be achieved. As can be observed in FIG. 3B, a substantially equal amount of storage capacity is consumed in each storage drive 204. Or alternatively, each storage drive 204 has a substantially equal amount of remaining storage capacity. This results in more optimal utilization of storage space in the RAID.

Figure 4A:
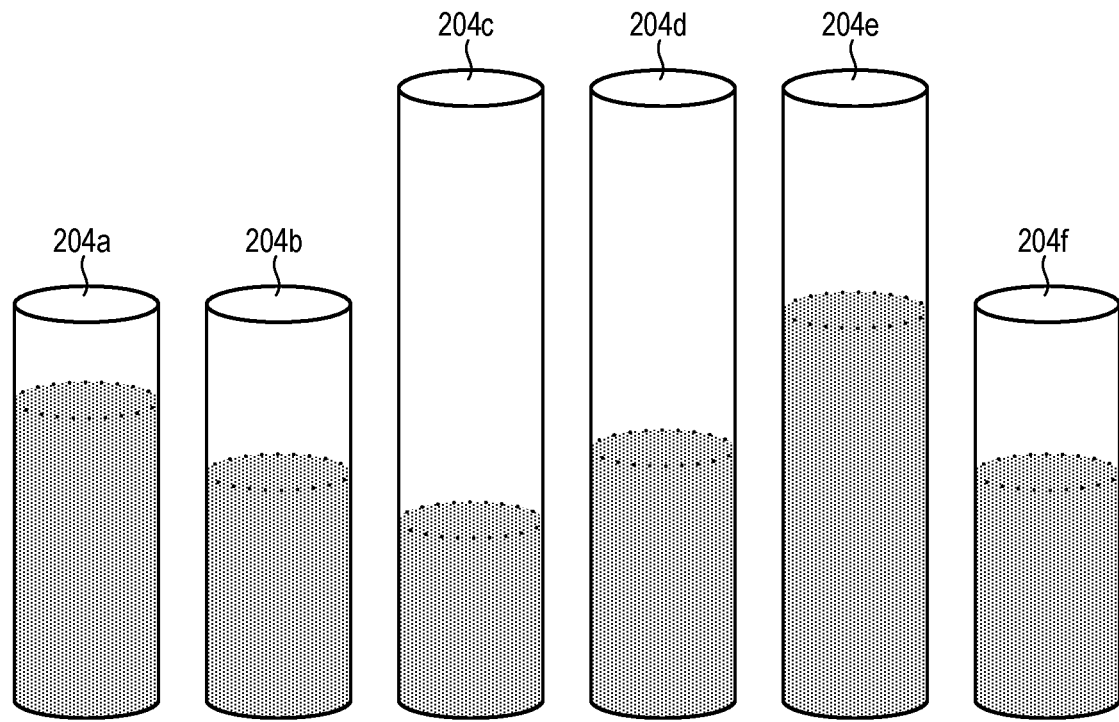
FIG. 4A shows non-optimal utilization of storage space in a RAID having storage drives of differing storage capacity.

Referring to FIG. 4A, in certain embodiments, storage drives 204a-f of differing storage capacity may be used to create a RAID (the visually taller storage drives 204c-e are intended to represent storage drives 204 having more storage capacity than the other storage drives 204a, 204b, 204f). In this example, assume that the RAID uses a fixed parity rotation and that data is compressed prior to being stored in the RAID. As can be observed in FIG. 4A, a result may be achieved similar to that illustrated in FIG. 3A. That is, storage capacity of the storage drives 204a-f may be consumed at different rates, thereby causing the storage drives 204a-f to store different amounts of data and to have different residual storage capacities. This results in sub-optimal storage utilization in the RAID.

Figure 4B:
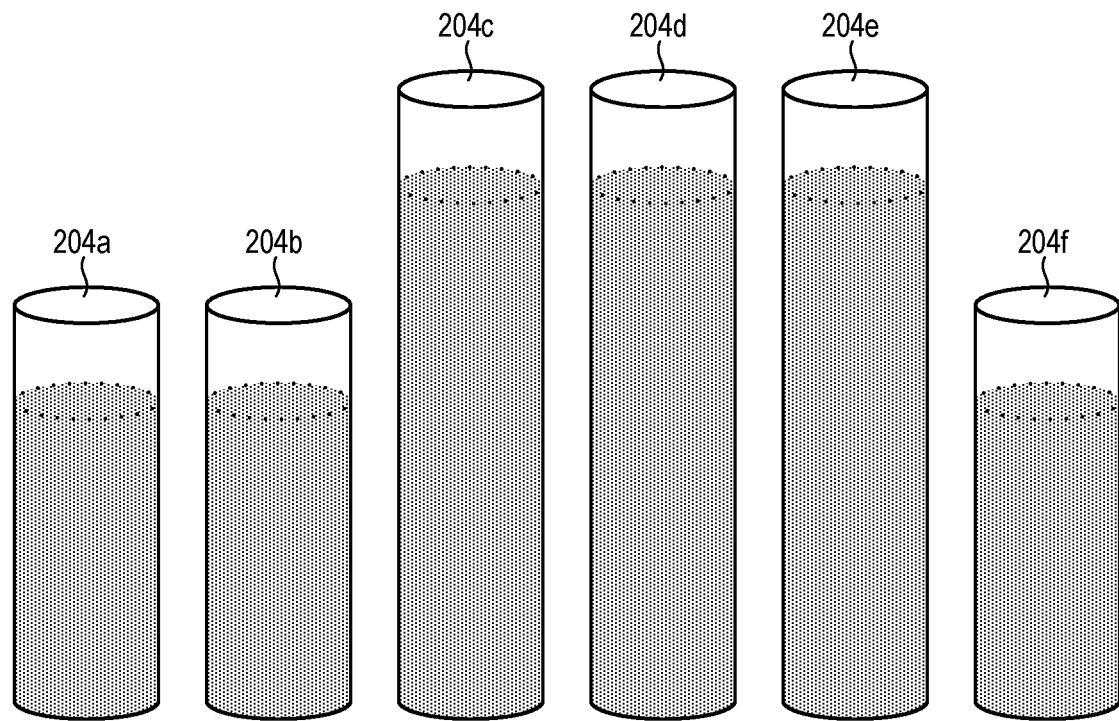
FIG. 4B shows use of adaptive parity rotation to create a more optimal utilization of storage space in a RAID having storage drives of differing storage capacity.

Referring to FIG. 4B, by contrast, adaptive parity rotation may be used to achieve a more optimal utilization of storage space. Using adaptive parity rotation, more parity values may be stored in the larger-capacity storage drives 204c-e than the smaller-capacity storage drives 204a, 204b, 204f, thereby causing the storage capacity of these storage drives 204c-e to be consumed more quickly. In certain embodiments, once each storage drive 204 in the RAID has substantially the same amount of residual storage capacity, the parity rotation may be adapted to maintain a substantially equal amount of residual storage capacity in each storage drive 204. This will cause the storage drives 204a-f to reach full capacity at substantially the same time, thereby achieving more optimal utilization of storage space in the RAID.

Figure 5A:
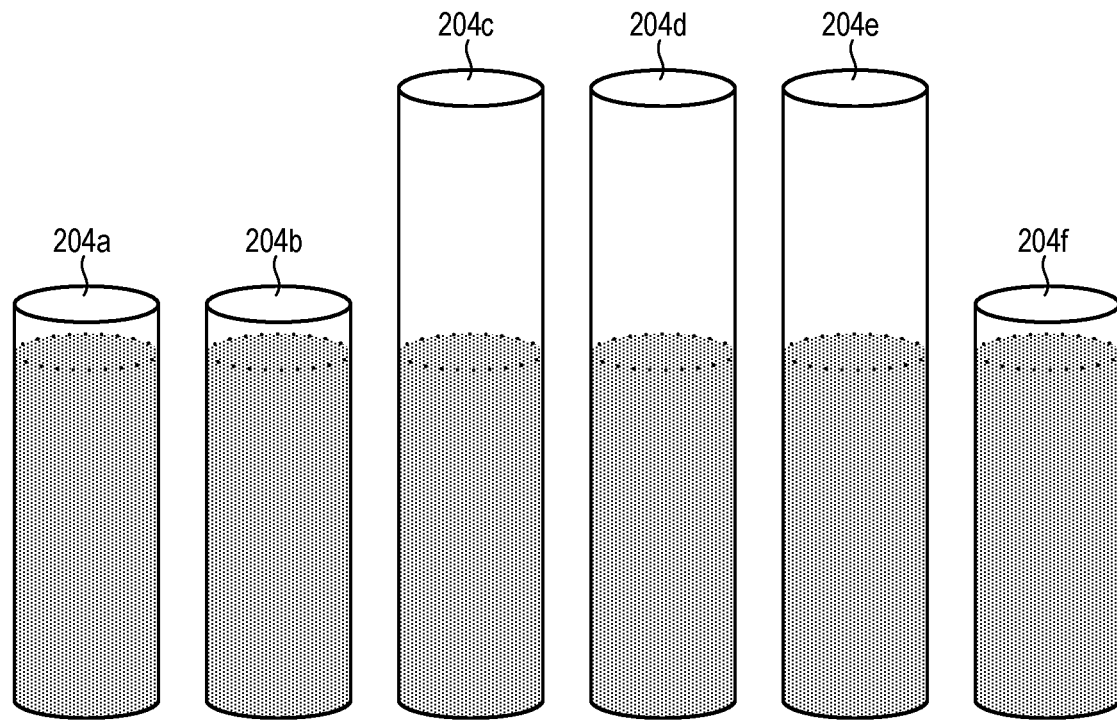
FIG. 5A shows use of adaptive parity rotation to create a more optimal utilization of storage space in a RAID having storage drives of differing storage capacity.
Figure 5B:
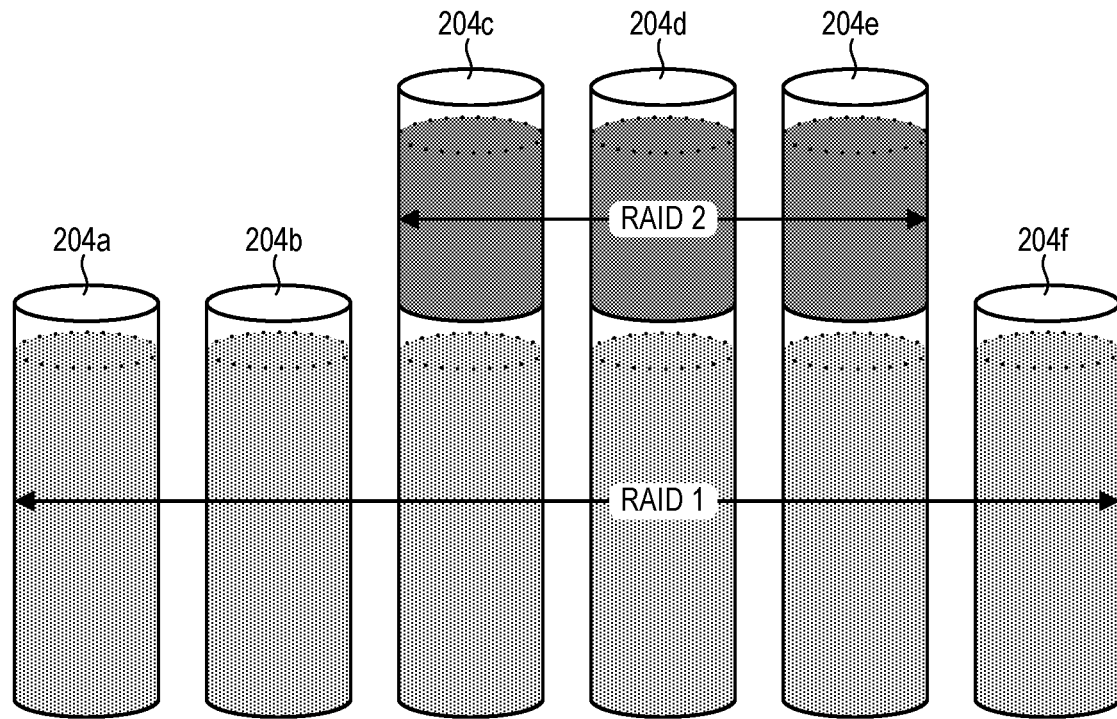
FIG. 5B shows creating a second shorter stride RAID in a set of storage drives of differing storage capacity.

Referring to FIG. 5A, alternatively, systems and methods in accordance with the invention may use adaptive parity rotation to cause the storage capacity of the storage drives 204a-f to be consumed at substantially the same rate regardless of the size (i.e., storage capacity) of the storage drives 204a-f. Thus, as shown in FIG. 5A, each storage drive 204 may have substantially the same amount of consumed storage space. This may leave a certain amount (ideally an equal amount) of residual unconsumed storage space in the larger storage drives 204c-e. In certain embodiments, this residual storage space may be used to create a second shorter stride RAID, as shown in FIG. 5B. Adaptive parity rotation may, in certain embodiments, be used in this shorter stride RAID to ensure that each larger storage drive 204c-e maintains a substantially equal amount of residual storage space. The darker shading represents storage capacity consumed in the storage drives 204c-e of the second shorter stride RAID. Thus, in certain embodiments, the storage space of storage drives 204a-f of differing storage capacity may be carved up to create two (or more) separate RAIDs. Adaptive parity rotation may be used in some or all of the separate RAIDs to provide more optimal utilization of storage space.

Figure 6A:
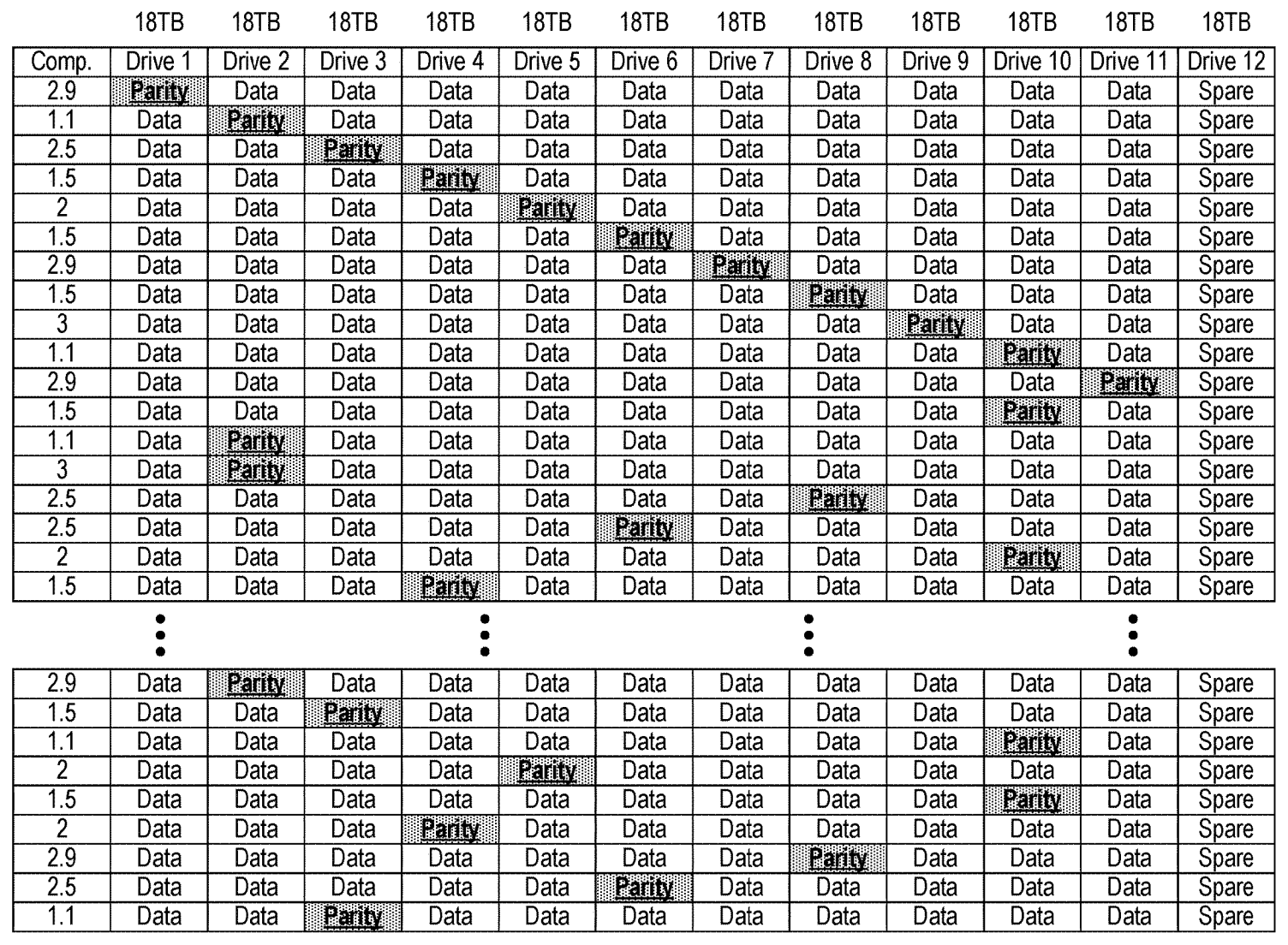

FIG. 6A is a table showing an improved technique for utilizing storage space in a RAID utilizing block-level striping with distributed parity values. In this example, the RAID is made up of twelve storage drives 204 (with one storage drive 204 being used as a spare), where each of the storage drives 204 has substantially equal storage capacity, in this example 18 terabytes (TB) of storage space. The storage drives 204 are labeled one through twelve. Each row in the table represents a stride (or stripe) of data, with each stride made up of multiple strips of data (one strip per storage drive 204) and a parity value.

In this example, the RAID is further configured to store compressed data. Because each stride (or stripe) of data may have a different level of compressibility, the compression ratio for each stride may vary between one and three in the illustrated example. A ratio of one would indicate no compression, a ratio of two would indicate that data is compressed to half its original size, and a ratio of three would indicate that data is compressed to a third of its original size. The compression ratio for each stride in this example is shown in the left-hand column of the table.

In order to more optimally utilize storage space in RAID arrays utilizing block-level striping with distributed parity values, systems and methods in accordance with the invention may adjust the parity rotation in the RAID. FIG. 6A shows data and parity values in a RAID array comprising eleven storage drives 204 of equal size and where data stored therein is compressed. In this example, a fixed parity rotation is initially used in the RAID array. After some number of strides (eleven in this example), adaptive parity rotation is then used to distribute parity values across the storage drives 204 in a way that attempts to equalize, as much as possible, the remaining amount of storage space in each of the storage drives 204. This may be accomplished by always placing the parity value in the storage drive 204 that has the most remaining storage space.

This technique may optimize the utilization of storage space in the RAID array. FIG. 6B is a table showing the remaining storage capacity in each storage drive 204 after each stride for the RAID array of FIG. 6A. The column on the right-hand side of the table shows the remaining storage capacity of the storage drive 204 that has the most residual storage capacity. The parity value will typically be stored in this storage drive 204 in the next stride. Using the technique illustrated in FIG. 6A, the remaining storage capacity in each storage drive 204 is equalized as much as possible and, as shown in FIG. 6B, only 0.7% of the total storage capacity of the RAID remains after the last stride is written, thereby providing an efficient use of storage space.

Referring to FIG. 7A, a second scenario is presented with a RAID array made up of storage drives 204 of equal storage capacity. This example is similar to that described in association with FIG. 6A except that it is assumed that a data compression engine associated with a particular storage drive 204 (in this example Drive 4) fails for the last seven strides written to the RAID array. In such a scenario, data will be written to Drive 4 in an uncompressed format for the last seven strides. This will cause the storage capacity of Drive 4 to be consumed faster than the storage capacity of the other storage drives 204 in the RAID array. In order to mitigate this problem as much as possible, parity values may be written to the other storage drives 204 of the RAID so that these storage drives 204 fill up at a faster rate than they would otherwise. FIG. 7B is a table showing remaining storage capacity in each storage drive 204 for the scenario shown in FIG. 7A. As shown in FIG. 7B, using the technique illustrated in FIG. 7A, only 11.6% of the total storage capacity of the RAID remains after the last stride is written, thereby providing a more efficient use of storage space than would have otherwise occurred if parity values were written to Drive 4 after the failure of its compression engine.

Referring to FIG. 8A, a third scenario is presented of a RAID array made up of storage drives 204 of differing storage capacity. Data is compressed prior to being written to the storage drives 204. The data compression ratio for each stride of data is shown in the left-most column.

In this example, one of the storage drives 204 (i.e., Drive 8) has a larger storage capacity (i.e., 30 TB) compared to the other storage drives 204. In order to compensate for this larger storage capacity, all parity values are written to the larger storage drive 204 until the remaining storage space in each storage drive 204 is similar or substantially equal. At this point, the parity rotation may be adapted to distribute parity values across the set of storage drives 204 to maintain a similar amount of residual storage capacity in each storage drive 204. In certain embodiments, this may be achieved by writing the parity value to the storage drive 204 having the most residual storage capacity.

FIG. 8B is a table showing remaining storage capacity in each storage drive after each stride for the scenario shown in FIG. 8A. The column on the right-hand side of the table shows the remaining storage capacity for the storage drive 204 having the most residual storage capacity. As shown in FIG. 8B, using the technique illustrated in FIG. 8A, only 1.1% of the total storage capacity of the RAID array will remain after the last stride is written, thereby providing a more efficient use of storage space than if parity values were rotated in a fixed manner around the storage drives 204.

Figure 9A:
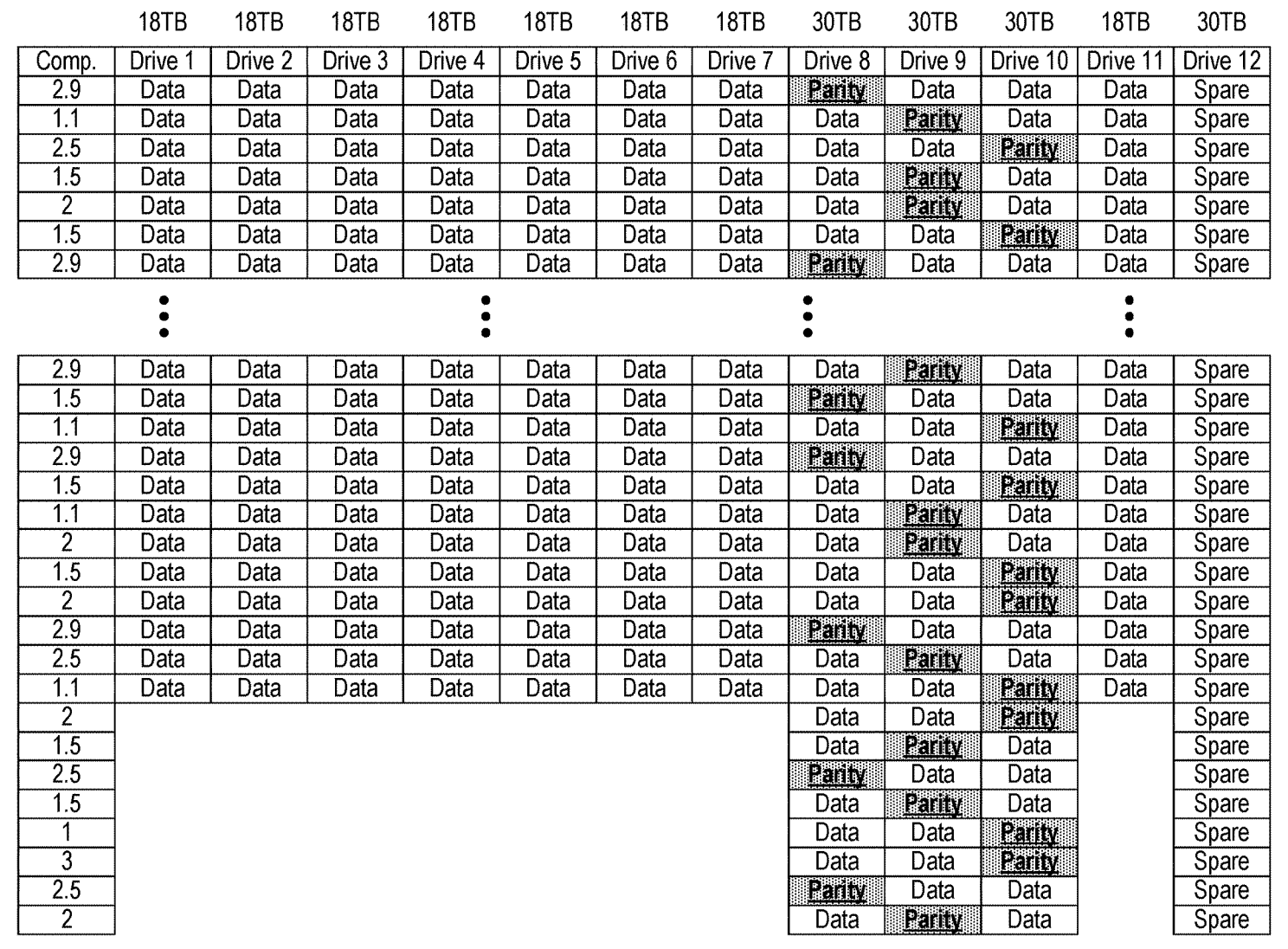

Referring to FIG. 9A, a fourth scenario is presented of a RAID array made up of storage drives 204 of differing storage capacity. Data is compressed prior to being written to the storage drives 204. The data compression ratio for each stride of data is shown in the left-most column.

In this example, multiple storage drives 204 (i.e., Drive 8, Drive 9 and Drive 10) have larger storage capacities (i.e., 30 TB) compared to the other storage drives 204. In order to compensate for these larger storage capacities, parity values may be placed on these storage drives 204 in an adaptive manner to equalize, as much as possible, the remaining storage capacity in the larger storage drives 204. This process may continue until the storage capacity of the smaller storage drives 204 is fully consumed. At this point, some residual storage capacity may remain in the larger storage drives 204. In order to utilize this residual storage capacity, an additional RAID array may be created using only the residual storage capacity of the larger storage drives 204. For example, in the illustrated example, the additional RAID array would utilize only three storage drives 204 (i.e., Drive 8, Drive 9 and Drive 10). In essence, the set of storage drives 204 illustrated in FIG. 9A would be used to create two separate RAID arrays, where each RAID array utilizes a different number of storage drives 204 from the set and each has a different stride length. The additional RAID (made up of three storage drives 204) would increase the overall usable storage capacity of the full array of storage drives 204. The adaptive parity rotation described herein may be used to ensure that a substantially equal amount of storage capacity remains and/or is consumed in the storage drives 204 of either RAID array.

To implement the adaptive parity rotation concepts disclosed herein, a table or other data structure may be maintained to store the parity rotation for each stride of the RAID array. This table or data structure may, for example, be stored in high-speed memory 214 of a storage system 110 to enable rapid access. In certain embodiments, the table or data structure may be protected (e.g., such as with error-correcting codes) to avoid data corruption and to verify that the data is intact. In certain embodiments, multiple synchronous copies of the table or data structure may be maintained. Additionally, in certain embodiments, the table or data structure may be stored in the metadata of the storage drives 204 so that it is recoverable if more volatile versions of the table or data structure are lost. When reading or writing to the RAID array, the table or data structure may be referenced to properly identify the parity values and ensure that they are updated (e.g., in response to a write) or utilized (e.g., in response to a read used for rebuild) or discarded (e.g., in response to a read not used for rebuild).

Although the concepts disclosed herein have been discussed primarily in association with a RAID-5 array having a single parity value in each stride, the concepts disclosed herein may be readily extended to RAID arrays having multiple parity values, such as RAID-6 or RAID-10 arrays. Thus, nothing in this disclosure should be interpreted to limit embodiments of the invention to RAID-5 arrays or RAID arrays utilizing a single parity value per stride.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for more efficiently utilizing storage space in a redundant array of independent disks (RAID), the method comprising:
   implementing a RAID comprising a plurality of storage drives, the RAID utilizing data striping with distributed parity values, the distributed parity values being placed on selected storage drives of the RAID in accordance with a parity rotation;
   determining, for each storage drive in the RAID, a residual storage capacity by taking into account the storage drive's consumed storage capacity relative to its total storage capacity;
   as the RAID fills up with data, repeatedly determining a storage drive on which to store a next parity value written to the RAID by repeatedly recalculating the residual storage capacity for each storage drive in the RAID;
   adaptively altering the parity rotation of the RAID to store parity values in storage drives of the RAID having the most residual storage capacity; and
   implementing, in a subset of the storage drives, a second RAID that utilizes residual storage capacity in the subset.

2. The method of claim 1, wherein the storage drives comprise storage drives of differing storage capacities.

3. The method of claim 1, wherein adaptively altering the parity rotation comprises providing an increased concentration of parity values in certain storage drives of the RAID compared to other storage drives of the RAID.

4. The method of claim 1, wherein adaptively altering the parity rotation comprises equalizing consumed storage capacity in each of the storage drives of the RAID.

5. The method of claim 1, wherein the storage drives comprise storage drives of the same storage capacity.

6. The method of claim 1, wherein the storage drives store compressed data.

7. The method of claim 1, wherein adaptively altering the parity rotation comprises storing parity values in storage drives of the RAID having the most residual storage capacity at the time the parity values are stored.

8. A computer program product for more efficiently utilizing storage space in a redundant array of independent disks (RAID), the computer program product comprising a computer-readable medium having computer-usable program code embodied therein, the computer-usable program code configured to perform the following when executed by at least one processor:
   implement a RAID comprising a plurality of storage drives, the RAID utilizing data striping with distributed parity values, the distributed parity values being placed on selected storage drives of the RAID in accordance with a parity rotation; and
   determine, for each storage drive in the RAID, a residual storage capacity by taking into account the storage drive's consumed storage capacity relative to its total storage capacity;
   as the RAID fills up with data, repeatedly determine a storage drive on which to store a next parity value written to the RAID by repeatedly recalculating the residual storage capacity for each storage drive in the RAID;
   adaptively alter the parity rotation of the RAID to store parity values in storage drives of the RAID having the most residual storage capacity; and
   implementing, in a subset of the storage drives, a second RAID that utilizes residual storage capacity in the subset.

9. The computer program product of claim 8, wherein the storage drives comprise storage drives of differing storage capacities.

10. The computer program product of claim 8, wherein adaptively altering the parity rotation comprises providing an increased concentration of parity values in certain storage drives of the RAID compared to other storage drives of the RAID.

11. The computer program product of claim 8, wherein adaptively altering the parity rotation comprises equalizing consumed storage capacity in each of the storage drives of the RAID.

12. The computer program product of claim 8, wherein the storage drives comprise storage drives of the same storage capacity.

13. The computer program product of claim 8, wherein the storage drives store compressed data.

14. The computer program product of claim 8, wherein adaptively altering the parity rotation comprises storing parity values in storage drives of the RAID having the most residual storage capacity at the time the parity values are stored.

15. A system for more efficiently utilizing storage space in a redundant array of independent disks (RAID), the system comprising:
   at least one processor;
   at least one memory device coupled to the at least one processor and storing instructions for execution on the at least one processor, the instructions causing the at least one processor to:
   implement a RAID comprising a plurality of storage drives, the RAID utilizing data striping with distributed parity values, the distributed parity values being placed on selected storage drives of the RAID in accordance with a parity rotation;
   determine, for each storage drive in the RAID, a residual storage capacity by taking into account the storage drive's consumed storage capacity relative to its total storage capacity;
   as the RAID fills up with data, repeatedly determine a storage drive on which to store a next parity value written to the RAID by repeatedly recalculating the residual storage capacity for each storage drive in the RAID;
   adaptively alter the parity rotation of the RAID to store parity values in storage drives of the RAID having the most residual storage capacity; and
   implementing, in a subset of the storage drives, a second RAID that utilizes residual storage capacity in the subset.

16. The system of claim 15, wherein the storage drives comprise storage drives of differing storage capacities.

17. The system of claim 15, wherein adaptively altering the parity rotation comprises providing an increased concentration of parity values in certain storage drives of the RAID compared to other storage drives of the RAID.

18. The system of claim 15, wherein adaptively altering the parity rotation comprises equalizing consumed storage capacity in each of the storage drives of the RAID.

19. The system of claim 15, wherein the storage drives comprise storage drives of the same storage capacity.

20. The system of claim 15, wherein the storage drives store compressed data.

\* \* \* \* \*